United States Patent [19]

Hauptman

[11] Patent Number: 4,535,643

[45] Date of Patent: Aug. 20, 1985

[54] THREADLESS FEED SCREW

[76] Inventor: Murray L. Hauptman, 27330 Arborway, Southfield, Mich. 48034

[21] Appl. No.: 376,063

[22] Filed: May 10, 1982

[51] Int. Cl.³ .............................................. F16H 27/02
[52] U.S. Cl. ............................................ 74/89; 74/25
[58] Field of Search ...................................... 74/25, 89

[56] References Cited

U.S. PATENT DOCUMENTS

| | | | |
|---|---|---|---|
| 676,044 | 6/1901 | Locke | 74/25 |
| 2,944,431 | 7/1960 | Dexter | 74/89 |
| 3,081,639 | 3/1963 | Hauptman | 74/25 |
| 3,391,722 | 7/1968 | Ligh | 74/89 X |
| 3,903,748 | 9/1975 | Krogsrud | 74/25 |
| 3,990,317 | 11/1976 | Gilman et al. | 74/25 |
| 4,224,831 | 9/1980 | Nilsson | 74/89 |

Primary Examiner—Rodney H. Bonck
Attorney, Agent, or Firm—Cullen, Sloman, Cantor, Grauer, Scott and Rutherford

[57] ABSTRACT

An improved threadless feed screw mechanism includes elongated concentric inner and outer races radially spaced apart from each other with a cage positioned between the races. The cage includes a plurality of rollers each positioned in a slot, the slots having axes inclined relative to the axes of the races. The rollers are normally in contact with the facing surfaces of the inner and outer races. A portion of at least one of the facing surfaces is recessed providing a clearance for the rollers. As the rollers and cage move, the rollers advance along the slot relative to the cage. As each roller moves into the recessed area a cam member returns the roller to the opposite end of the slot.

1 Claim, 7 Drawing Figures

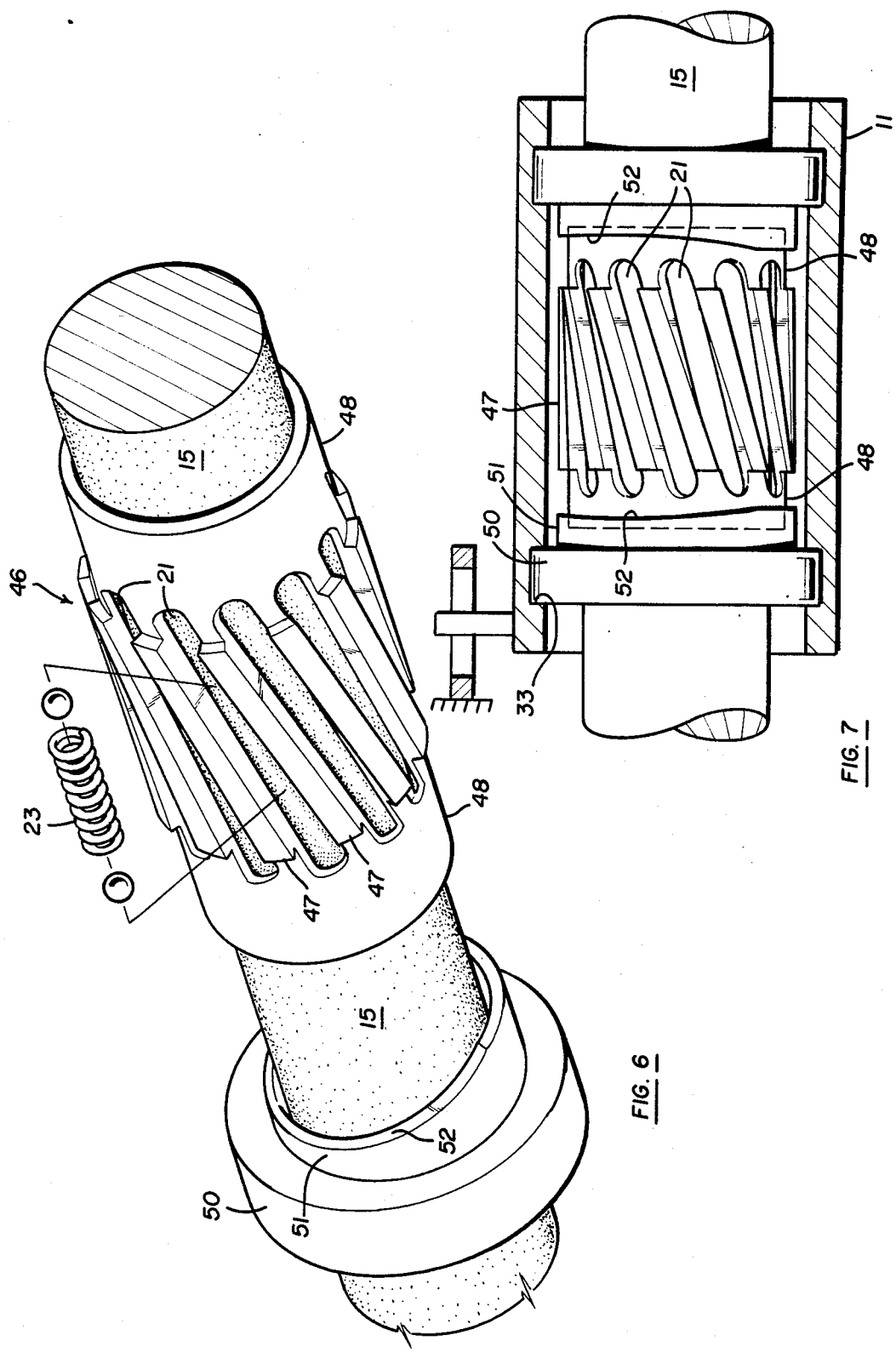

THREADLESS FEED SCREW

BACKGROUND OF THE INVENTION

This invention relates to threadless feed mechanisms and, more particularly, to an apparatus for converting between rotary and axial motion.

In my prior patent entitled "Feed Mechanism", U.S. Pat. No. 3,081,639 of Mar. 19, 1963, which is hereby incorporated by reference, I disclose a feed mechanism having inner and outer radially spaced apart races, a cage positioned between the races and elongated rollers carried by the cage. The rollers have axes inclined with respect to the axes of the races and the rollers are constantly in contact with the facing surfaces of the inner and outer races.

With respect to the apparatus described in my prior patent, the feed mechanism converts rotary motion of the outer race to axial movement of the inner race. In the apparatus of my prior patent, movement of the two races relative to each other is limited by the length of the outer race because the cage cannot move axially beyond the ends of the outer race. In other words, the maximum axial movement of the inner race is limited by the axial length of the outer sleeve which limits the axial distance which the cage can travel.

The present invention provides a different approach to the movement of the cage relative to the races thereby avoiding the aforementioned limitation.

SUMMARY OF THE INVENTION

The present invention provides an improved feed mechanism including inner and outer races with a slotted cage therebetween, and with rollers in the slots, where the rollers move along the slot and, more specifically, when the rollers reach the end of the slot the rollers are "recycled", i.e., repositioned to the opposite end of the slot, and with the cage moving axially with the axially moving race. Because the rollers are recycled the cage and rollers may be used with a rotating race of indeterminate length. Hence, the length of the outer race and the movement of the rollers no longer limit the extent of relative movement between the inner and outer races. The cage, in one form of the invention, has its slots longer than the rollers to allow the rollers the freedom to traverse the distance required for one revolution of the cage and then the rollers are repositioned sequentially to their original starting positions. Thus an extremely short outer race may be provided thereby reducing overall costs in the manufacture of a threadless feed mechanism.

The present invention includes a threadless feed mechanism having inner and outer races with a cage positioned between the races. The cage has a plurality of slots therein and rollers are provided in each slot. The slots and the rollers in the slots are inclined axially in relation to the longitudinal axes of the races, and the slots are longer than the rollers permitting axial travel of the rollers within the slots. The rollers rotate and move axially within the slot and at the end of the slot the rollers are recycled back to the opposite end of the slot. The cage is constrained against axial movement within the outer race and is fixed relative to the outer race but is permitted to rotate freely. The rollers rotate and move axially because of the inclined slots and move within these slots until each roller, in turn, reaches a relieved area where the roller is moved by a cam means back to the opposite end of the slot. Two different forms of cams means are disclosed. Continuous repositioning of each roller, sequentially, permits continued movement of the inner and outer races relative to each other without the requirement of axial travel of the cage within the outer race.

BRIEF DESCRIPTION OF THE DRAWINGS

The various objects and advantages of the present invention will become more apparent upon reading the following detailed description of the invention taken in conjunction with the drawings.

In the drawings, wherein like reference numerals identify corresponding components:

FIG. 6 is a perspective illustration of an alternate form of the cage and rollers of the present invention; and FIG. 7 is an enlarged cross-sectional view of the feed mechanism including the cage of FIG. 6 and illustrating an alternate form of means for recycling the rollers.

DETAILED DESCRIPTION OF THE INVENTION

Figure 1:
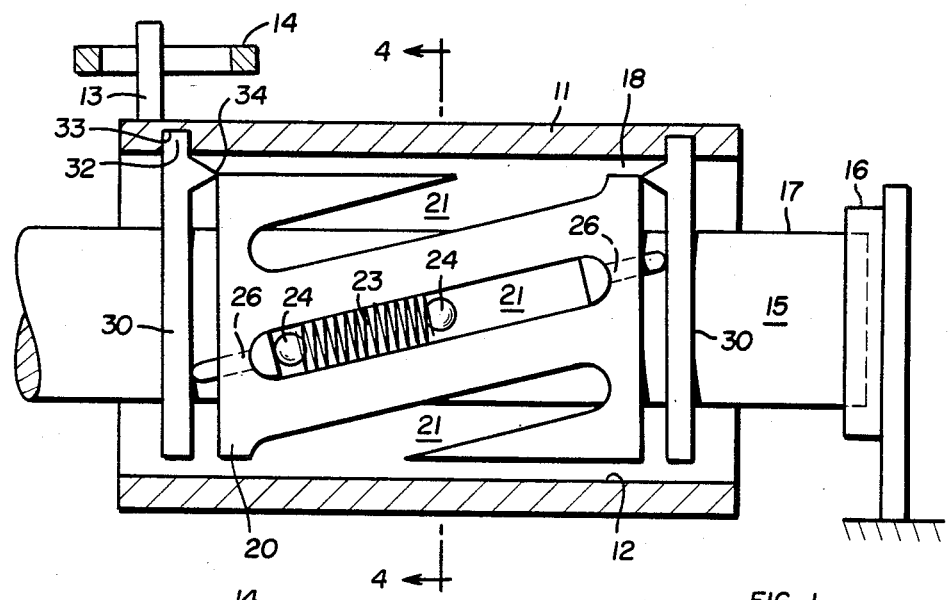
FIGS. 1, 2 and 3 are a series of enlarged cross-sectional views illustrating the improved feed mechanism of the present invention including a first means for recycling the rollers and illustrating progressive rotation of the cage.

With reference to the drawings, the present invention will now be described. It must be understood that threadless feed mechanisms of the present type may be used to convert rotational motion to axial motion and vice-versa. My prior U.S. Pat. No. 3,081,639 illustrates an embodiment of a feed mechanism including an outer race mounted so that it may rotate but not move axially, and an inner race mounted so that it may move axially but not rotationally.

The improved feed mechanism of the present invention contemplates structures where either one of the races may be mounted for axial movement. Thus, for explanatory purposes only, and not for purposes of limitation, I have chosen to show an improved feed mechanism where the outer race is mounted for axial movement only and the inner race mounted for rotational movement only. It must be appreciated, however, that this is for purpose of explanation of the principles of the present invention as will be hereinafter described.

The apparatus of the present invention comprises an outer race 11 comprising a tubular member or elongated sleeve having an inner surface 12. The outer race 11 includes, at one end, an extension 13 extending radially outwardly, with the radial extension 13 fitted within a slotted member 14. Thus, the outer race 11 may move axially or longitudinally; rotational movement is prohibited by the contact between the radial extension 13 and the slot in the slotted member 14.

The apparatus further includes an inner race 15 shown in the form of a round shaft mounted interiorly of the outer race 11. The outer race is concentrically mounted relative to the inner race. The shaft or inner race 15 is mounted for rotational movement and is supported at each end by bearings 16 (shown at one end only) which permit free rotation of the race 15, but prevent axial movement thereof. The inner race 15 includes an outer surface 17, and a space 18 is provided between the surface 12 of the outer race 11 and the surface 17 of the inner race 15. The surfaces 12 and 17 are referred to as facing surfaces.

FIGS. 1-5 illustrate a first form of a cage. Specifically, mounted within the space 18 between the races is a cage 20 formed as an annular sleeve. The cage 20 has a wall thickness substantially thinner than the annular space 18 between the races and the cage is provided with a plurality of slots 21 extending through the wall of the cage. Each slot 21 is of elongated shape and the axis of each slot is inclined with respect to the longitudinal axis of the cage 20. The degree of inclination is to be selected based upon the desired input-to-output speed ratio desired of the apparatus. A roller 23 is provided within each of the slots 21. Each roller preferably comprises a helical coil spring of outside diameter sufficient to fit tightly between the inner and outer facing surfaces 12, 17, of the races 11 and 15, and with a desired preload depending upon the frictional force which should be maintained and the expected wear of the facing surfaces. In other words, the unstressed outer diameter of each of the helical coil rollers 23 is slightly greater than the space between the inner and outer races. The rollers are substantially shorter in axial length than the axial length of the slots 21. In the form of the invention illustrated in FIGS. 1-5 thrust bearings such as ball bearings 24 are disposed in each of the slots 21 at each end of each roller to prevent the ends of the rollers or helical springs 23 from catching on the ends of the slots. Other configurations of rollers, as described in my prior patent, may also be used.

Each end of the cage 20 is provided with a series of axial apertures 25 through its end walls, the apertures being co-linear with the longitudinal center line of the respective slot. A pusher member 26 is provided at each end of each slot, the pusher member having an enlarged head 27 within the slot and an elongated stem 28 connected to the head which stem extends through the aperture 25 and outwardly of the cage 20.

A pair of end plates 30 are provided, one at each end of the cage 30. Each of the end plates is in the form of a ring having a large open diameter 31 through which the inner race 15 extends. Each end plate 30 has an upstanding tab 32 which fits within a small notch 33 formed in the inner facing surface 12 of the outer race 11. The cooperation of the tab and notch prevent the end plates from rotating relative to the outer race. The end plates each include, on their surfaces facing the cage and just below the tab 32, a cam means 34.

In the present invention there is a relieved or recessed portion or groove 40 in the inner facing surface 12 of the outer race 11. This relieved portion 40 extends at least the full length of the cage 20.

Figure 2:
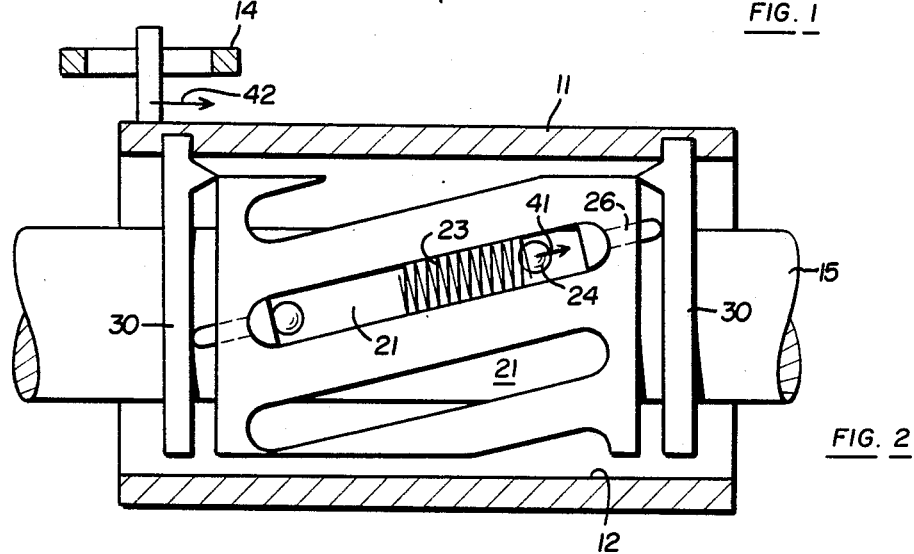
Figure 3:
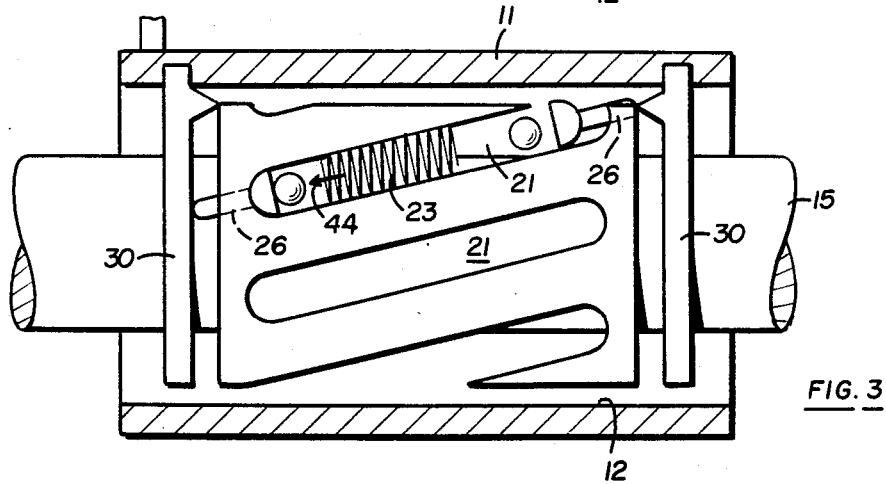

The operation of the present invention will now be explained. Assume it is desired to move the outer race 11 axially. The inner race 15 is rotated clockwise relative to the view of FIG. 4. Cage 20 fits loosely between the end plates 30 so that it will rotate freely but is constrained against any meaningful axial movement. As the inner race 15 is rotated, the rollers 23 rotate with a planetary motion within the annular space 18 because of the firm contact between the rollers and the inner and outer facing surfaces 12, 17. The rollers 23 cause the cage 20 to rotate also. The rollers also travel axially within the elongated slots in the cage 20 and force the outer sleeve 11 to travel axially in relation to the inner race 15. FIG. 1 shows a typical starting position and FIG. 2 illustrates movement of the roller 23, as illustrated by arrow 41, and the corresponding axial movement of the outer race as illustrated by arrow 42.

Figure 4:
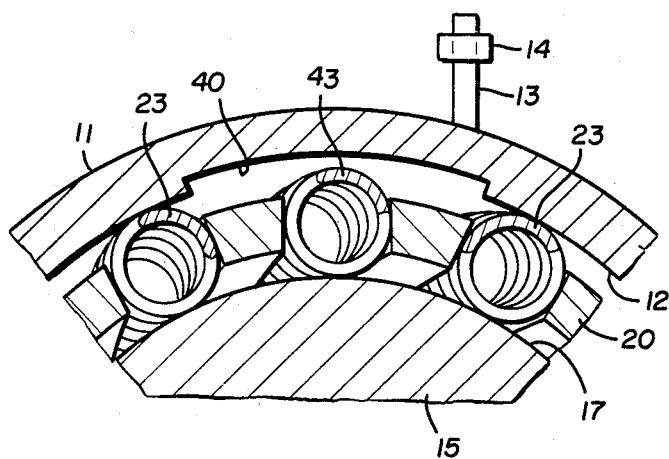
FIG. 4 is an enlarged fragmentary cross-sectional view taken along the line 4—4 of FIG. 1.
Figure 5:
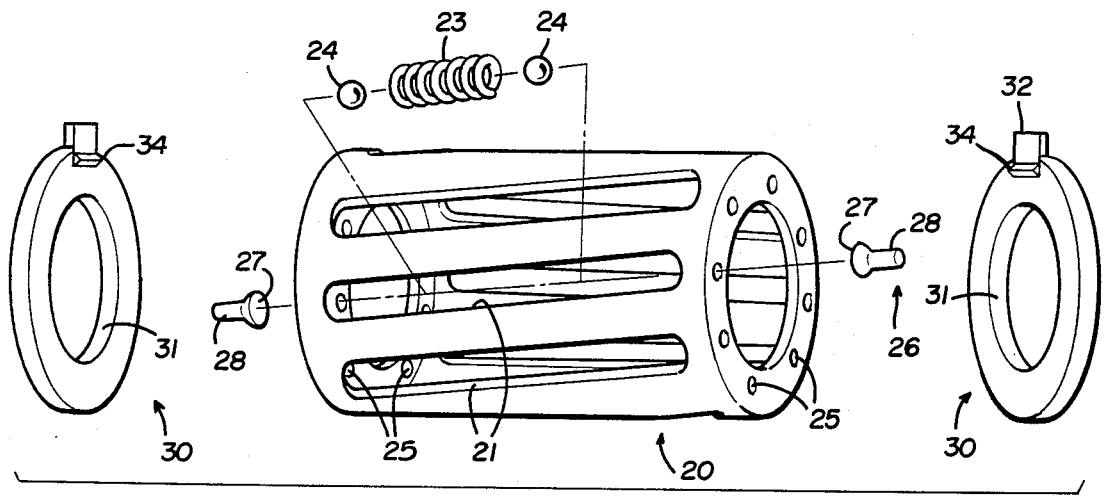
FIG. 5 is an exploded perspective view of the improved cage of the present invention.

When each of each helical coil roller 23 in turn reaches the relieved portion 40 in the outer race 11, as illustrated by the position of roller 43 in FIG. 4, the roller is no longer in contact between the inner and outer races. The roller is thus free to slide longitudinally in its respective slot. As each roller moves into the relieved area, its associated pusher member 26 contacts the cam means 34 on the end plate. The cam means contacts the stem 28 of the pusher member and moves the pusher member axially inwardly of the slot causing the head 27 of the pusher member to contact the ball bearing which in turn contacts the roller and moves the roller axially in the slot. This is illustrated diagrammatically by arrow 44 in FIG. 3. This action takes place sequentially for each roller as it enters the relieved area. Since there is an end plate 30 at each end of the outer race 11, the above-described action takes place whether the cage is rotating in a clockwise direction or a counter-clockwise direction.

Thus, each roller advances axially within its slot and, as it enters the relieved portion between the inner and outer races, it is recyled or moved back to the opposite end of the slot so that continued rotation of the cage is possible.

FIGS. 6 and 7 illustrate another form of the present invention. In the configuration of FIG. 6 the cage 46 is an elongated hollow sleeve having a central axial portion 47 and two opposed end portions 48 of a reduced or stepped down diameter. The central portion 47 is somewhat shorter than the rollers 23 and the slots 21 extend the full elngth of the central portion 47 of the cage 46 and partially into each of the stepped down diameter end portions 48. Bearings 24 may be used with the roller 23 but there is no need to use the pusher members 26.

Cam means are provided at each end of the cage 46 for "recycling" the rollers 23. In the form of the invention disclosed in FIGS. 6 and 7 each cam means is formed as a sleeve 50 positioned in the notch or groove 33 in the outer race 11 with the sleeve having an inwardly positioned axial extension 51 of reduced diameter to fit loosely over the stepped down portion of the cage. The axially inward edge 52 of the reduced diameter section of the cam directly pushes the rollers 23 along the slots as the rollers reach the relieved area 40 of the outer race 11.

The foregoing is a complete description of the present invention. Various changes and modifications may be made without departing from the spirit and scope of the present invention. The present invention is illustrated in the form of an outer race which is movable only axially and an inner race which is movable only rotationally. The relative rotational movements of these parts may be reversed as illustrated in my aforementioned prior patent.

If the outer race is mounted for rotational movement and the inner race mounted for axial movement, as in my prior patent, then as the relieved or recessed portion 40 moves over each roller, since the plates 30 or cams sleeves 50 rotate with the outer race, the cam means will move each roller in sequence. Thus, a short outer race and a short cage may be used to provide axial movement of the inner race where the extent of such axial movement far exceeds the extent of such movement available using the structure of my prior patent.

The present invention, therefore, should be limited only by the scope of the following claims.

What is claimed is:

1. In a feed mechanism of the type including an elongated inner race and an elongated outer race concentrically surrounding said inner race and radially spaced apart therefrom, a cage disposed between said races and a plurality of elongated rollers carried by said cage, said rollers having axes inclined relative to the race axes, the inner surface of said outer race and the outer surface of said inner race defining the facing surfaces of the races; said rollers normally being in contact with said facing surfaces, the improvement comprising:

a portion of at least one of said facing surfaces having a recess for providing a clearance, said rollers each being sequentially out of contact with at least one of said facing surfaces when each said roller is in said recess;

each of said rollers is of lesser axial length than the axial length of said cage, said rollers each rolling and also moving axially in a first direction in said cage; each roller moving axially in a second direction opposite to said first direction when each said roller is in said recess;

said cage includes a plurality of elongated slots; each of said plurality of elongated rollers being mounted in one of said slots; each of said rollers being of lesser axial length than said slot;

said mechanism further includes a cam means positioned at opposite ends of said cage, said cam means for moving said rollers when said rollers are in said recess;

each cam means includes an annular sleeve having an axial extension, the axially inwardmost portion of each such cam means for moving said rollers;

said inner race is mounted for rotational movement and constrained against axial movement, and said outer race is mounted for axial movement and constrained against rotational movement; and said cage includes a central portion of a first diameter and axially extending end portions of a second diameter smaller than said first diameter.

* * * * *